United States Patent [19]

Elmer et al.

[11] Patent Number: 5,421,685

[45] Date of Patent: Jun. 6, 1995

[54] VACUUM-TYPE GRIPPING APPARATUS

[75] Inventors: Wallace S. Elmer, Hamilton; Richard V. Rigling, Fairfield, both of Ohio

[73] Assignee: Stanley-Vidmar, Inc., Cincinnati, Ohio

[21] Appl. No.: 43,624

[22] Filed: Apr. 7, 1993

Related U.S. Application Data

[63] Continuation of Ser. No. 818,921, Jan. 10, 1992, abandoned.

[51] Int. Cl.⁶ ............................................. B65G 1/04
[52] U.S. Cl. ....................................... 414/280; 901/40; 414/661; 414/752; 294/65; 294/64.1
[58] Field of Search ............... 414/280, 281, 277, 273, 414/752, 737, 659, 661, 282, 283; 294/65, 64.1; 364/478; 901/40

[56] References Cited

U.S. PATENT DOCUMENTS

| | | | |
|---|---|---|---|
| 2,699,878 | 1/1955 | Avery | 414/661 X |
| 3,147,872 | 9/1964 | Olson | 414/627 X |
| 3,750,804 | 8/1973 | Lemelson | 414/280 X |
| 3,951,277 | 4/1976 | Hegelman | 414/280 |
| 4,007,846 | 2/1977 | Pipes | 414/280 X |
| 4,389,157 | 6/1983 | Bernard, II et al. | 414/280 X |
| 4,561,176 | 12/1985 | Leddet | 901/40 X |
| 4,571,320 | 2/1986 | Walker | 414/752 X |
| 4,789,295 | 12/1988 | Boucher, Jr. et al. | 414/280 X |
| 4,878,798 | 11/1989 | Johansson | 414/280 |
| 5,082,418 | 1/1992 | Poux et al. | 901/40 X |
| 5,129,777 | 7/1992 | Pohjonen et al. | 414/280 |

FOREIGN PATENT DOCUMENTS

| | | | |
|---|---|---|---|
| 2617078 | 12/1988 | France | 901/40 |
| 143803 | 8/1984 | Japan | 414/280 |

*Primary Examiner*—Frank E. Werner
*Attorney, Agent, or Firm*—Arthur L. Plevy

[57] ABSTRACT

A vacuum-type gripping apparatus includes a frame which is movable between a retracted position, in which the frame is remote from an item stored in a storage bin, and an extended position, in which the frame is proximate to an item stored in the storage bin. The apparatus includes a vacuum-type gripping mechanism which grips the item to be extracted from the storage bin prior to and during the extraction operation. The vacuum-type gripping mechanism employs a redundant vacuum source which improves the operating reliability of the apparatus. A lifting mechanism, which is adapted to engage a bottom surface of the item to be extracted, cooperates with the vacuum-type gripping mechanism during the extraction operation.

18 Claims, 9 Drawing Sheets

VACUUM-TYPE GRIPPING APPARATUS

This is a continuation of application Ser. No. 07/818,921, filed Jan. 10, 1992, now abandoned.

FIELD OF THE INVENTION

The present invention relates to storage and retrieval systems, and, more particularly, to an extractor/inserter device for such systems.

BACKGROUND OF THE INVENTION

Storage and retrieval systems were originally designed as unit loading devices for large pallets. Over the years, these systems have undergone many changes. One change, in particular, has been the shift from large-load stackers to mini-stackers and micro-stackers.

The smaller storage and retrieval systems (i.e., those employing mini-stackers or micro-stackers) are especially well suited for factory environments, as well as for warehouse environments. In addition, these systems are used for work-in-process buffers at the point of use to meet just-in-time and other processing requirements.

With the advent of the computer, sophisticated control systems have been developed for automating the operation of storage and retrieval systems. Thus, modern storage and retrieval systems can be automatically controlled by a computer to provide random access to numerous stock-keeping units. Some automated storage and retrieval systems even have capability to fill orders remotely.

A typical automated storage and retrieval system includes a single-level or multi-level rotary rack having a plurality of bins, each bin being adapted to receive a product or a product container. The single-level rotary rack is employed when the storage retrieval or random access rate at the bins is subordinate to storage volume at the bins. This type of rack rotates all of the bins simultaneously in the same direction. In contrast, the bins of the multi-level rotary rack are arranged in rows at different levels of the rack with each level being independently driven and controlled. This system is well suited for high rates of random access, or high throughput rates, at the bins.

An extractor/inserter device interfaces with either the single-level rotary racks or the multi-level rotary racks for the purpose of performing automated pick and put operations, whereby products or product containers are transferred to and from a point of need, such as a conveyor interface, operator work station or robotic interface. Traditionally, these extractor/inserter devices have been equipped with a pair of pinchers adapted to grip a product or a product container by way of a mechanical clamping operation.

While the extractor/inserter devices equipped with pinchers have performed well in applications in which the product or product containers are made from a standard material and in relatively standard shapes and sizes, they do encounter difficulties when used in certain applications in which the product or product containers are made from a variety of materials and come in different sizes and shapes. The U.S. Postal Service's mail tray staging and retrieval system is one example of the latter type of application. More particularly, because postal trays are fabricated from as many as three different materials and come in a variety of sizes and shapes having sidewalls which are angled to varying degrees, they make positive gripping by the pincher-type extractor/inserter devices difficult, if not impossible.

SUMMARY OF THE INVENTION

The problems and disadvantages of the prior art devices discussed above are overcome in accordance with the present invention by providing a new and improved extractor/inserter device (i.e., an apparatus for inserting items into a storage bin and for extracting items therefrom) which operates on a vacuum principle. More particularly, the new and improved extractor/inserter device includes a frame which is moved between a retracted position, in which the frame is remote from an item stored in the storage bin, and an extended position, in which the frame is proximate to an items stored in the storage bin, by any suitable transport mechanism, such as a chain-type drive. A gripping mechanism is attached to the frame and is adapted to grip an item stored in the storage bin by suction resulting from the creation of a vacuum in the gripping means by vacuum-creating means, such as a vacuum pump. In one embodiment, the gripping means includes a plurality of vacuum cups which are pivotally attached to the frame such that the vacuum cups can pivot to accommodate items, such as postal trays, having walls of various different slopes.

The frame is pivotally mounted so that it can pivot from a rest position to an elevated position. As the frame is moved from its rest position to its elevated position, a lifting mechanism carried by the frame engages a bottom surface of an item stored in the storage bin. The lifting mechanism continues to cooperate with the gripping mechanism as the frame is moved from its extended position towards its retracted position to accomplish the extraction of an item from the storage bin.

BRIEF DESCRIPTION OF THE DRAWINGS

For a better understanding of the present invention, reference is made to the following detailed description of an exemplary embodiment thereof, considered in conjunction with the accompanying drawings, in which.

DESCRIPTION OF THE EXEMPLARY EMBODIMENT

Although the present invention is applicable to many different types of storage and retrieval systems, it is especially suitable for use in connection with postal tray staging and retrieval systems, such as those employed by the U.S. Postal Service. Accordingly, the present invention will be described in connection with a postal tray staging and retrieval system of the type employed by the U.S. Postal Service.

Figure 1:
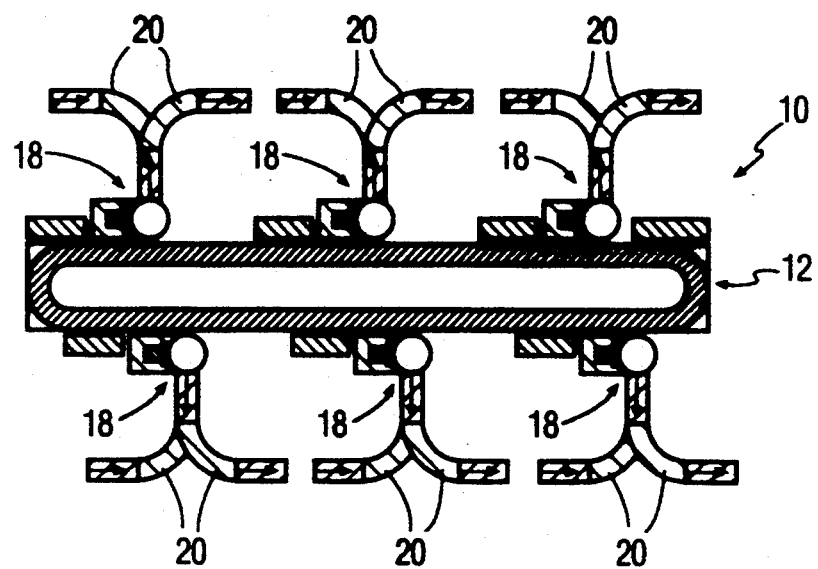
FIG. 1 is a schematic plan view of an automated storage and retrieval system.
Figure 2:
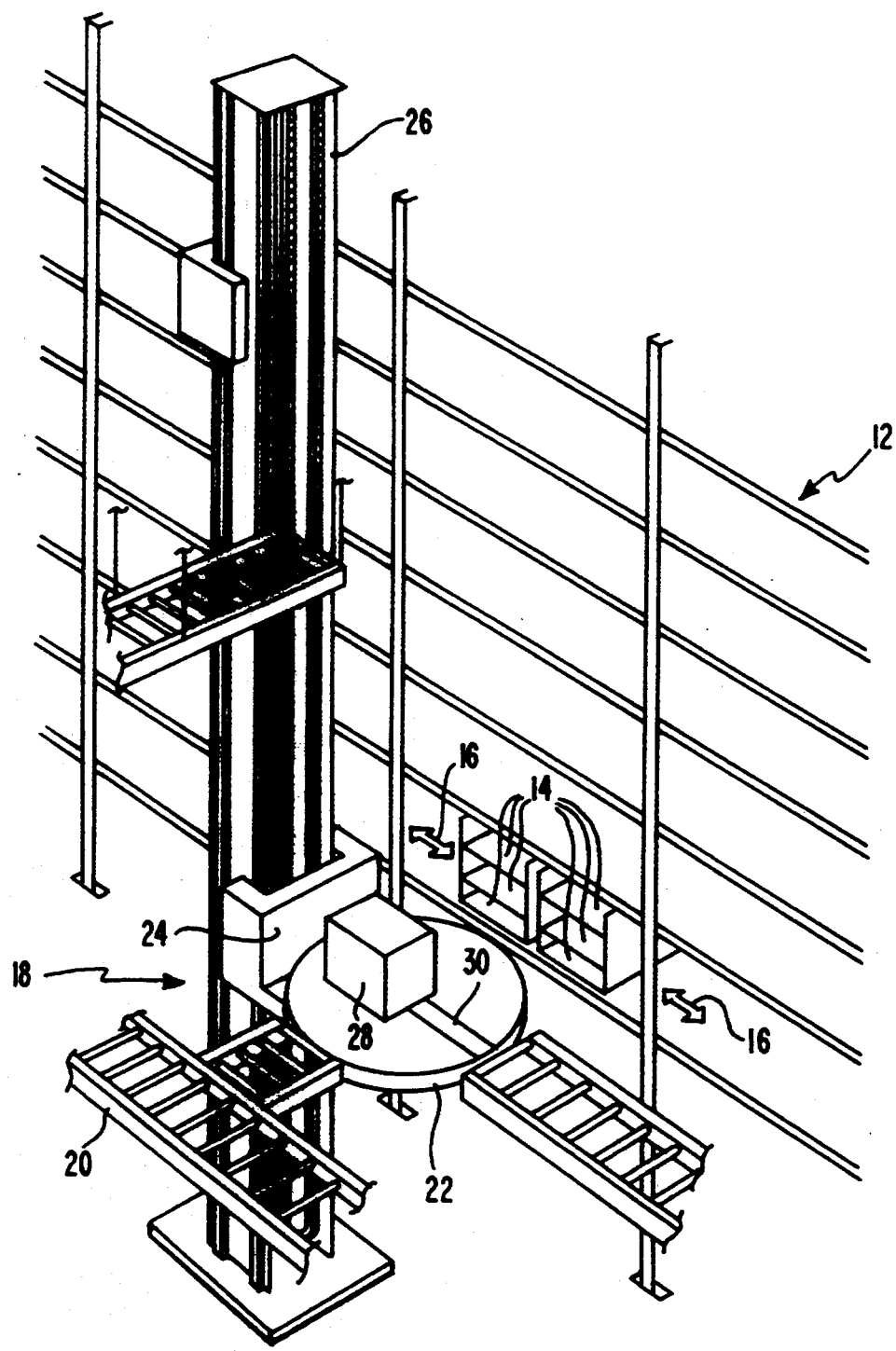
FIG. 2 is a perspective view of an extractor/inserter device employed by the storage and retrieval system of FIG. 1, the extractor/inserter device being equipped with a suction-type gripping mechanism (shown schematically) constructed in accordance with one exemplary embodiment of the present invention and mounted on an elevator-type turntable.

Referring to FIGS. 1 and 2, an automated postal tray staging and retrieval system 10 includes a rotary rack 12, which can be of a single-level type or a multi-level type. Regardless of whether it is of a single-level type or a multi-level type, the rotary rack 12 includes a plurality of bins 14 (see FIG. 2) arranged in rows and columns and adapted for movement in a carousel fashion as indicated by arrows 16 (see FIG. 2). Each of the bins 14 is sized and shaped so as to receive a postal tray (not shown).

The rotary rack 12 moves the postal trays (not shown) which are stored in the bins 14 to and from a plurality of extractor/inserter stations 18 positioned at predetermined locations around the periphery of the rotary rack 12. Input and discharge conveyors 20 interface with each of the extractor/inserter stations 18.

With particular reference to FIG. 2, each of the extractor/inserter stations 18 includes a circular turntable 22 which is rotatably mounted on an elevator 24 adapted for reciprocating vertical movement along a mast 26. The turntable 22 includes a suction-type gripping mechanism 28 (shown schematically) which can be moved back and forth across the turntable 22 by a transport mechanism (also shown schematically) 30.

Figure 3:
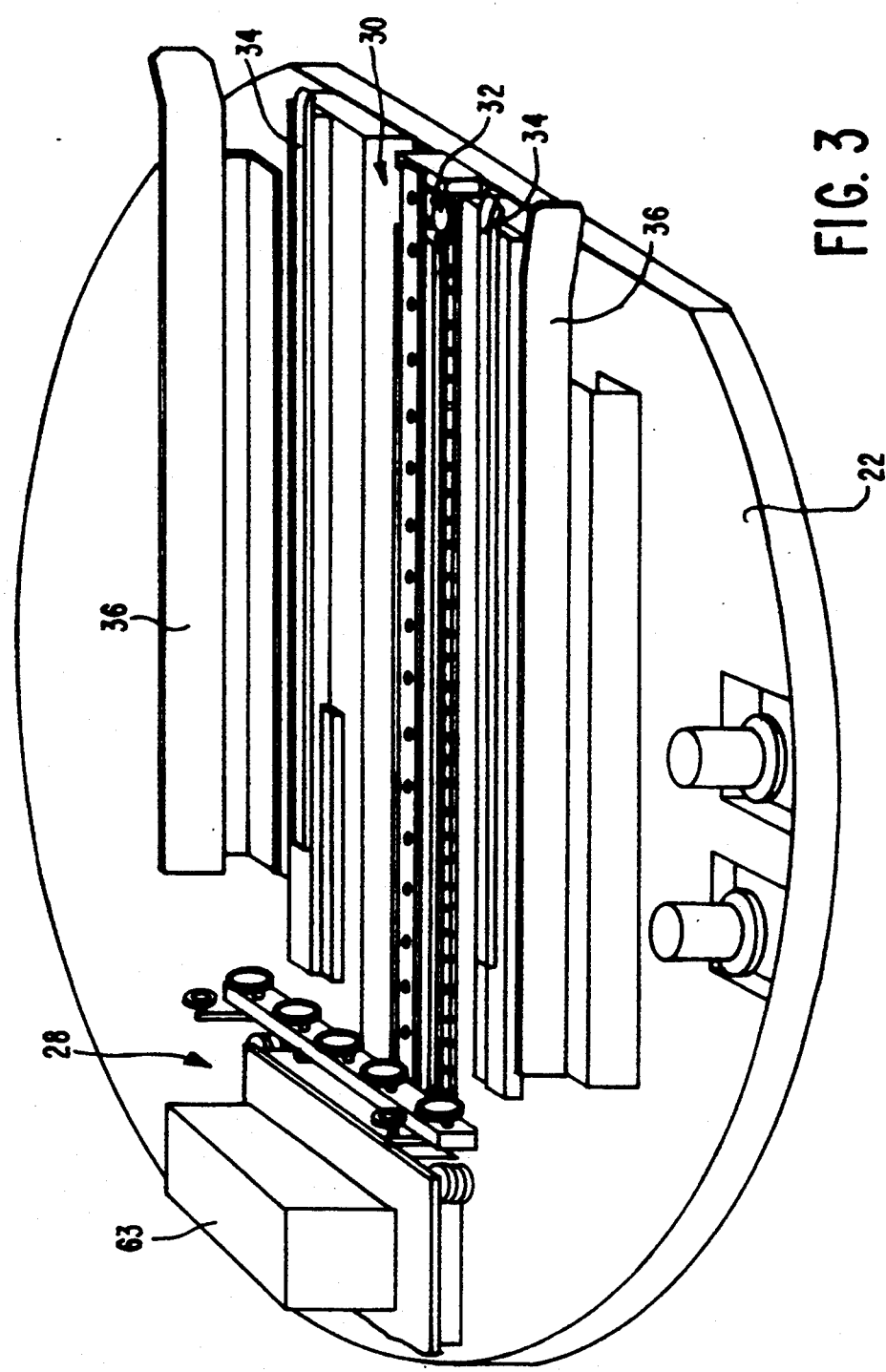
FIG. 3 is a top plan view of the turntable illustrated in FIG. 2, the suction-type gripping mechanism being shown in greater detail.

Referring now to FIG. 3, the transport mechanism 30 includes a chain-type drive assembly 32 which is mounted on the turntable between a pair of parallel tracks 34 extending across a portion of the turntable 22. The tracks 34 support a postal tray (not shown) as it is moved along the turntable 22 by the vacuum-type gripping mechanism 28. The tracks 34 are flanked by a pair of parallel guide rails 36 extending upwardly from the turntable 22. The guide rails 36 are spaced apart a distance sufficient to permit the postal tray (not shown) to pass between them as the postal tray is being moved along the tracks 34 by the vacuum-type gripping mechanism 28.

Figure 4:
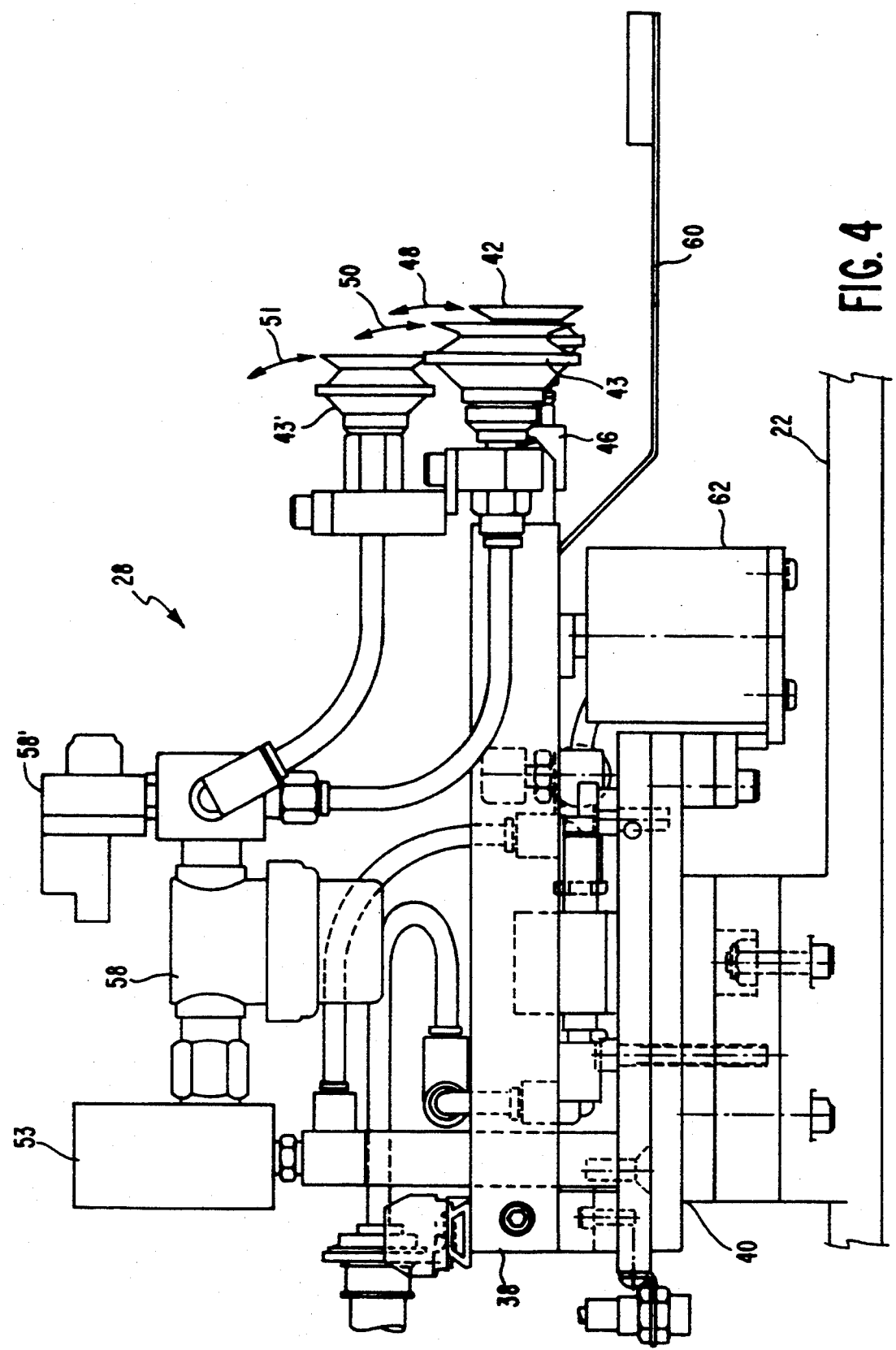
FIG. 4 is a side elevational view of the suction-type gripping mechanism of FIG. 3.
Figure 5:
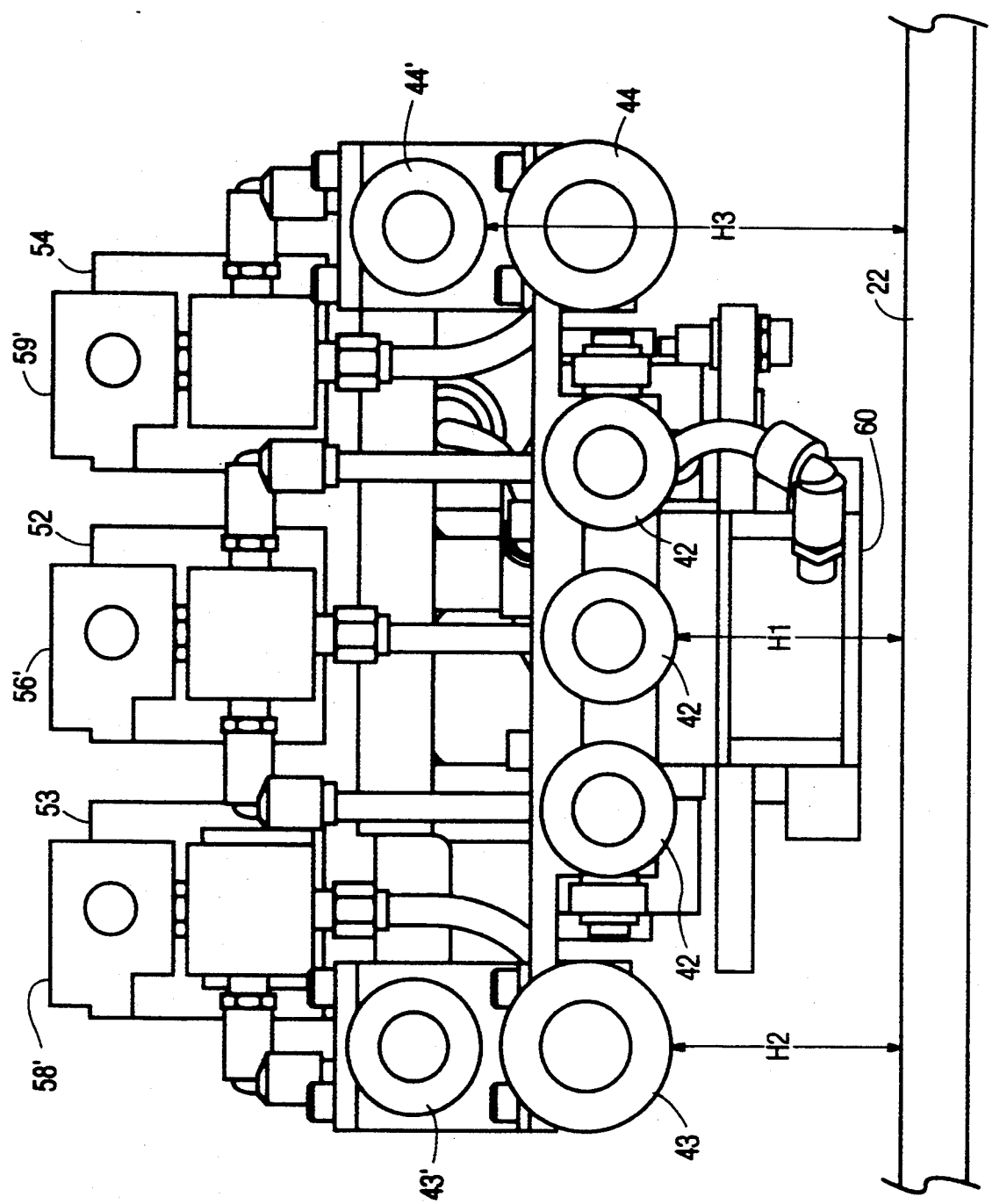
FIG. 5 is a front elevational view of the suction-type gripping mechanism of FIG. 3.
Figure 6:
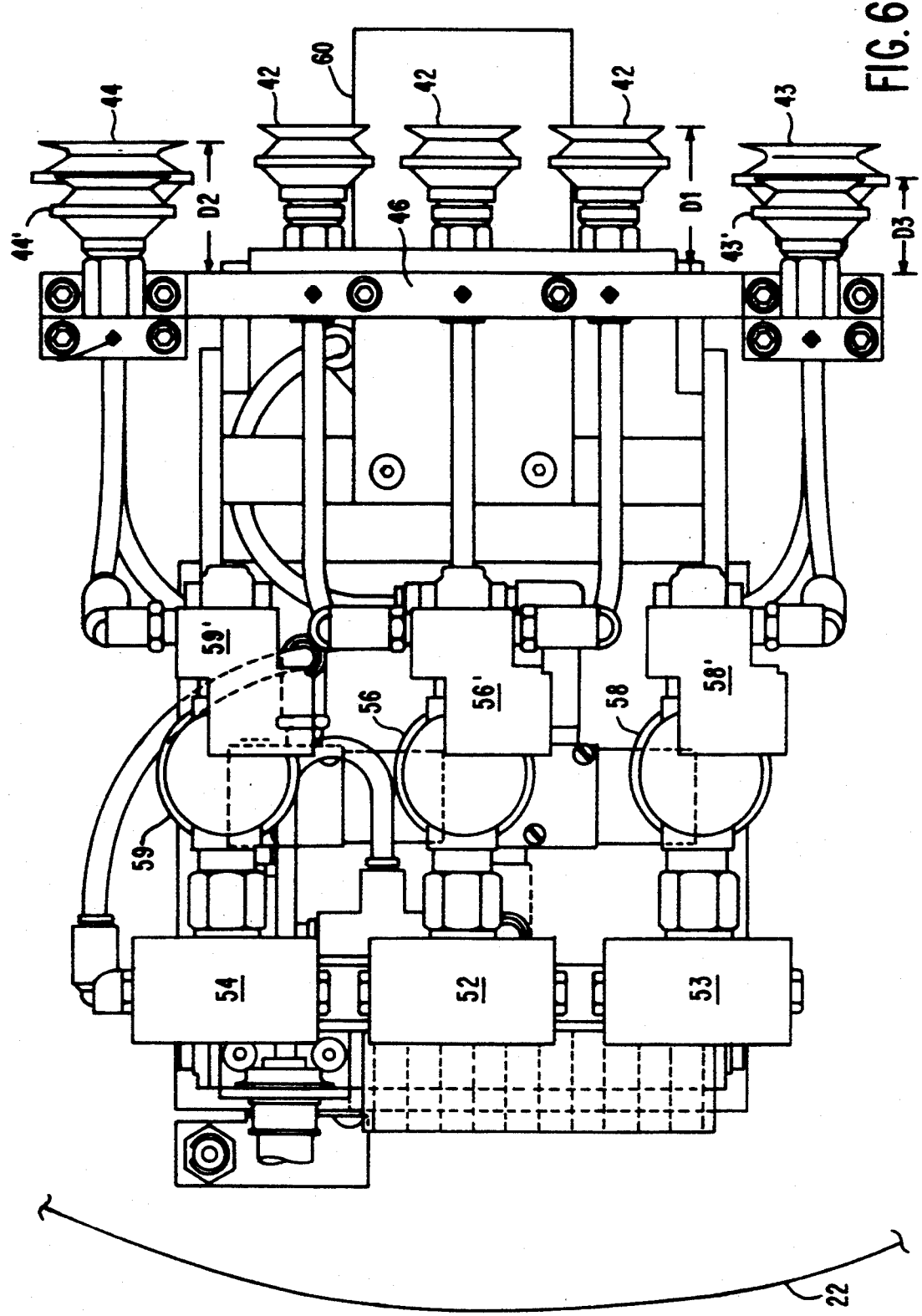
FIG. 6 is a top plan view of the suction-type gripping mechanism of FIG. 3.

With reference to FIGS. 4–6, the vacuum-type gripping mechanism 28 includes a frame 38 carried by a carriage assembly 40, which is coupled to the chain-type drive assembly 32 (shown in FIG. 3). Three interior suction cups 42, a first pair of exterior suction cups 43 and 43' positioned on one side of the interior suction cups 42, and a second pair of exterior suction cups 44 and 44' positioned on an opposite side of the interior suction cups 42 are attached to a support bar 46 (see FIG. 6). The support bar 46 is pivotally attached to the frame 38 such that the interior suction cups 42 can pivot from their rest positions illustrated in FIGS. 4–6 along an arc indicated by arrow 48 (see FIG. 4), while the exterior suction cups 43 and 44 can pivot from their rest positions illustrated in FIGS. 4–6 along an arc indicated by arrow 50 (see FIG. 4) and the exterior suction cups 43' and 44' can pivot from their rest positions illustrated in FIGS. 4–6 along an arc indicated by arrow 51 (see FIG. 4). While the interior suction cups 42 are positioned above the turntable 22 at a height H1 (see FIG. 5), the exterior suction cups 43 and 44 are positioned above the turntable 22 at a height H2 (see FIG. 5), which is slightly greater than the height H1 for a purpose to be described hereinafter, and the exterior suction cups 43' and 44' are positioned above the turntable 22 at a height H3 (see FIG. 5), which is slightly greater than both the height H1 and the height H2 for a purpose to be described hereinafter. While the interior suction cups 42 project outwardly from the support bar 46 by a distance D1 (see FIG. 6), the exterior suction cups 43 and 44 project outwardly from the support bar 46 by a distance D2 (see FIG. 6), which is slightly less than the distance D1 for a purpose to be described hereinafter, and the exterior suction cups 43' and 44' project outwardly from the support bar 46 by a distance D3 (see FIG. 6), which is slightly less than both the distance D1 and the distance D2 for a purpose to be described hereinafter.

A vacuum pump 52, which is connected to the interior suction cups 42, functions to create a vacuum in the interior suction cups 42. A vacuum pump 53, which is connected to the exterior suction cups 43 and 43', functions to create a vacuum in the exterior suction cups 43 and 43'. A vacuum pump 54, which is connected to the exterior suction cups 44 and 44', functions to create a vacuum in the exterior suction cups 44 and 44'. The vacuum pumps 52, 53 and 54 are provided with filters 56, 58 and 59, respectively, which prohibit foreign matter from being drawn into the vacuum pumps 52, 53 and 54 during their operation, and with vacuum switches 56', 58' and 59', respectively, whose function will be described hereinafter. While three separate sets of suction cups (i.e., the interior suction cups 42, the exterior suction cups 43 and 43', and the exterior suction cups 44 and 44') and three separate vacuum pumps (i.e., the vacuum pumps 52, 53 and 54) are employed in the exemplary embodiment illustrated in FIGS. 4–6, it should be understood that other suction cup and vacuum pump arrangements can be employed.

A lift bar 60 extends from the frame 38 beneath the interior suction cups 42. An air cylinder 62 (see FIG. 4) is employed to move the lift bar 60 between a rest position illustrated in FIGS. 4–6 and an elevated position for a purpose to be described hereinafter. The operation of the air cylinder 62 is controlled in response to the vacuum created in the interior suction cups 42 and/or the vacuum created in the exterior suction cups 43 and 43' and the exterior suction cups 44 and 44', as will be described in greater detail hereinafter.

A removeable cover 63 (see FIG. 3) can be provided to protect the vacuum-type gripping mechanism 28. Removal of the cover 63 facilitates maintenance, repair and inspection of the vacuum-type gripping mechanism 28.

Figure 7:
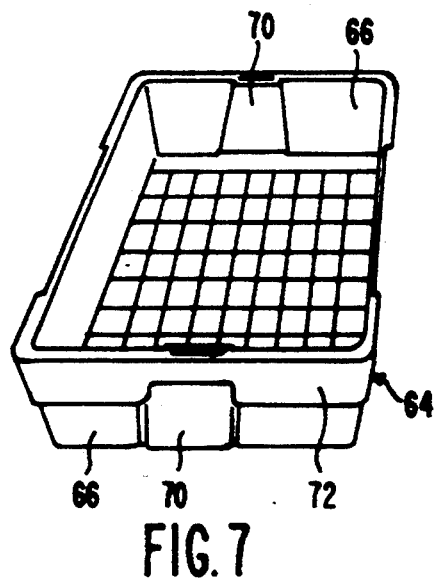
FIG. 7 is a top perspective view of one type of postal tray which can be gripped by the suction-type gripping mechanism of FIGS. 3-6.
Figure 8:
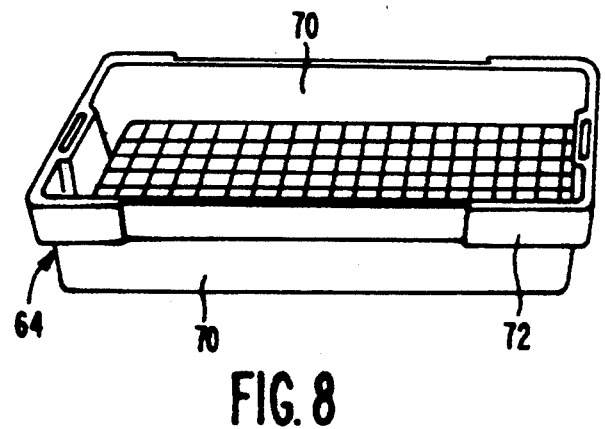
FIG. 8 is a side perspective view of the postal tray illustrated in FIG. 7.

Referring to FIGS. 7 and 8, a postal tray 64 has end walls 66 and sidewalls 68, all of which are sloped so as to form an inclined angle relative the horizontal. The end walls 66 have recesses 70 which function as handles. A skirt 72 extends around the end walls 66 and the sidewalls 68. The postal tray 64 is made from a rigid plastic.

Figure 9:
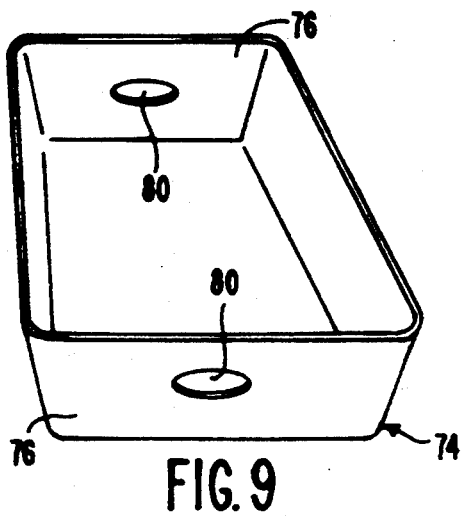
FIG. 9 is a top perspective view of another type of postal tray which can be gripped by the suction-type gripping mechanism of FIGS. 3-6.
Figure 10:
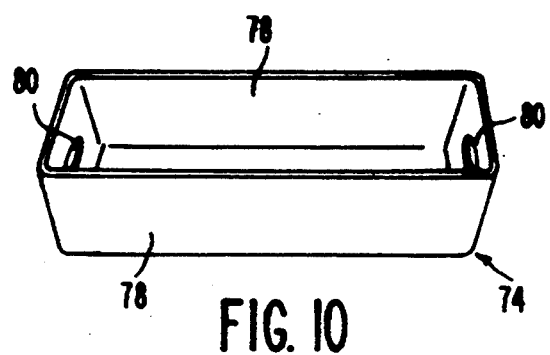
FIG. 10 is a side perspective view of the postal tray illustrated in FIG. 9.

With reference to FIGS. 9 and 10 a postal tray 74 has end walls 76 and sidewalls 78, all of which are sloped so as to form an inclined angle relative to the horizontal. The end walls 76 have apertures 80 which function as handles. The postal tray 74 is made from cardboard and has a size and shape which are different from those of the postal tray 64 illustrated in FIGS. 7 and 8.

Figure 11:
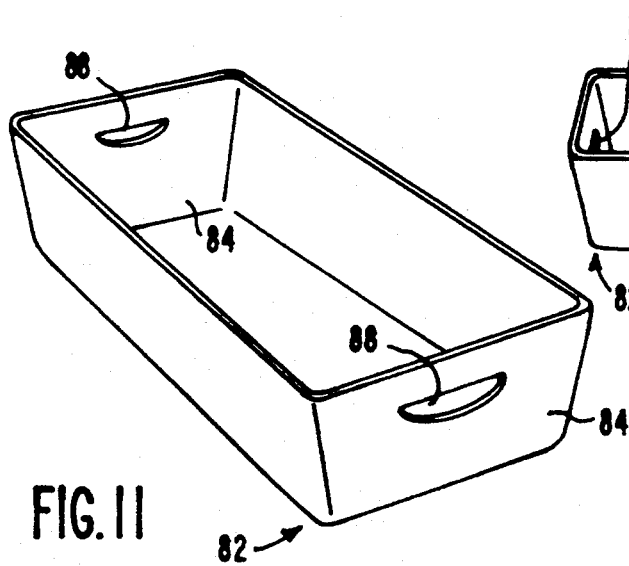
FIG. 11 is a top perspective view of yet another type of postal tray which can be gripped by the suction-type gripping mechanism of FIGS. 3–6.
Figure 12:
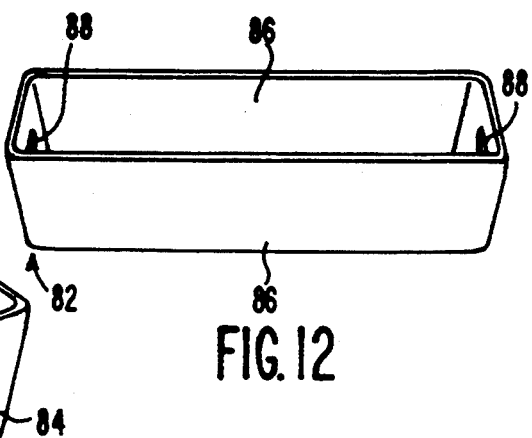
FIG. 12 is a side perspective view of the postal tray illustrated in FIG. 11.

Referring now to FIGS. 11 and 12, a postal tray 82 has end walls 84 and sidewalls 86, all of which are sloped so as to form an inclined angle relative to the horizontal. The end walls 84 have apertures 88 which function as handles. The postal tray 82 is made from corrugated plastic and has a size and shape which are different from those of the postal tray 64 illustrated in FIGS. 7 and 8 and the postal tray 74 illustrated in FIGS. 9 and 10.

Figure 13:
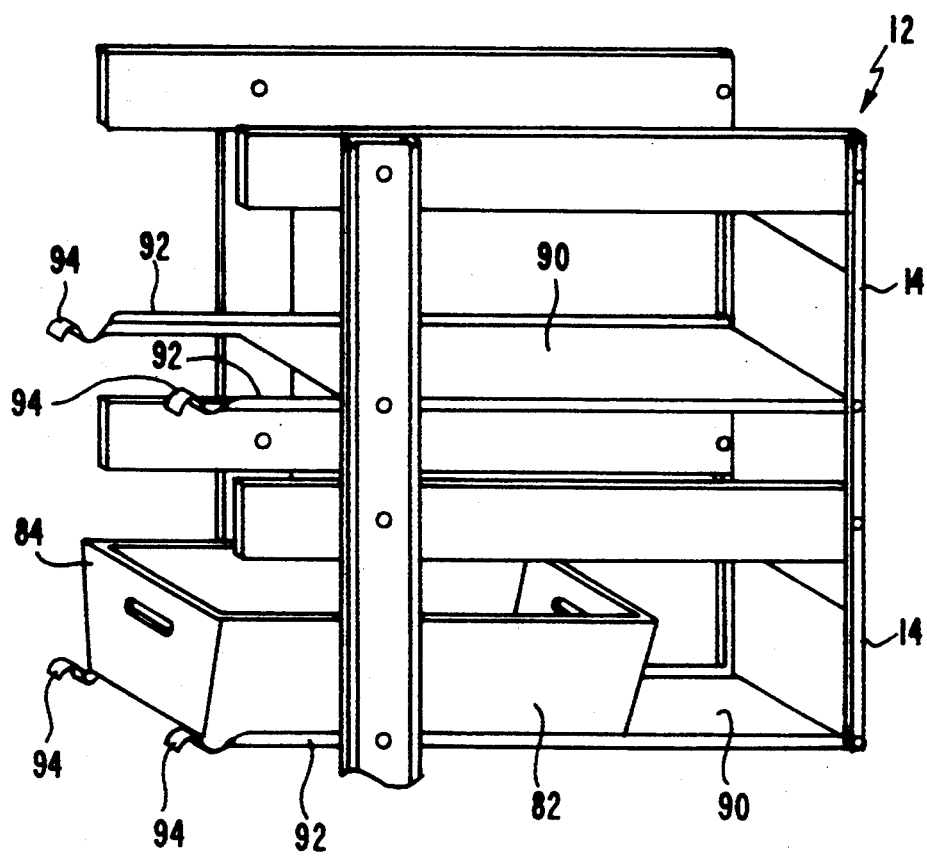
FIG. 13 is a perspective view of a bin in which the postal tray of FIGS. 11 and 12 is stored.
Figure 14:
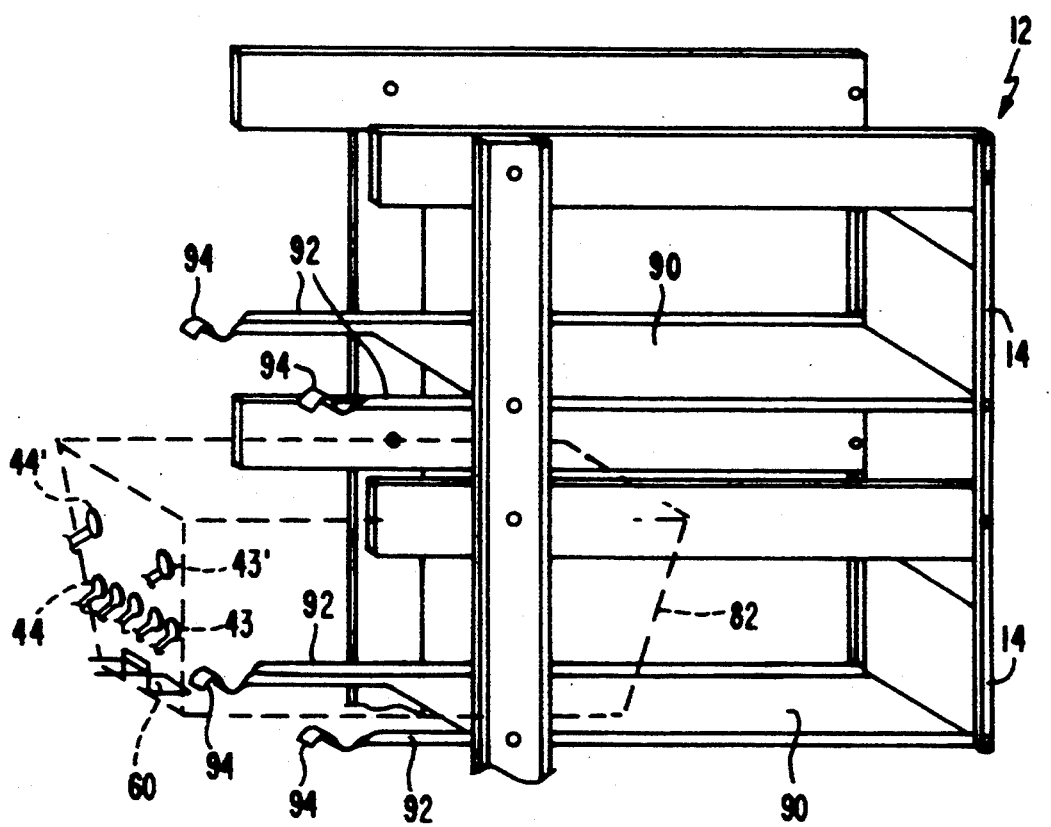
FIG. 14 is a perspective view similar to that of FIG. 13, except that the postal tray is shown as it is being removed from the bin by the suction-type gripping mechanism of FIGS. 3–6.

With reference to FIGS. 13 and 14, each of the bins 14 of the rotary rack 12 includes a shelf 90 and a pair of spaced-apart arms 92, each of which is provided with a retaining lip 94. One of the bins 14 is shown with the postal tray 82 resting on the shelf 90. The retaining lips 94 of the arms 92 prevent the postal tray 82 from sliding off of the shelf 90 due to the centrifugal forces acting on the postal tray 82 as the rotary rack 12 rotates. While the shelf 90 is shown as a storage facility for the postal tray 82, it should be understood that the shelf 90 could also accommodate either the postal tray 64 or the postal tray 74.

In operation, the vacuum-type gripping mechanism 28 functions to either insert or extract any one of the postal trays 64, 74 and 82 into or from the bins 14 of the rotary rack 12. A typical extraction operation will be described first, followed by a description of a typical insertion operation.

At the commencement of the retrieval operation, the vacuum-type gripping mechanism 28 is in its retracted position on the turntable 22. The vacuum pumps 52, 53 and 54 are disconnected from the interior suction cups 42 and the exterior suction cups 43, 43' and 44, 44', respectively, which are in their rest positions illustrated in FIGS. 4–6. The lift bar 60 is also in its rest position illustrated in FIGS. 4–6. The rotary rack 12 is rotated to position the bin 14 containing the tray 82 adjacent to the turntable 22. Visual confirmation or software is employed to verify that the tray 82 is in position to be retrieved.

Once the turntable 22 and the bin 14 are properly aligned, the turntable 22 is elevated or lowered along the length of the mast 26 so that the turntable 22 is at the same height as the bin 14 holding the postal tray 82. The turntable 22 is then rotated so that the vacuum-type gripping mechanism 28 faces the postal tray 82. The transport mechanism 30 then moves the carriage assembly 40 forward toward the bin 14. Initially, the carriage assembly 40 moves forward towards the bin 14 at a relatively high rate of speed. After the carriage assembly 40 has travelled a predetermined distance along the turntable 22 toward the bin 14, a switch (not shown) is triggered to slow the forward motion of the carriage assembly 40. As the carriage assembly 40 is slowed, the vacuum pumps 52, 53 and 54 are actuated to create a vacuum in the interior suction cups 42 and the exterior suction cups 43, 43' and 44, 44', respectively. The vacuum may be initiated by a timer (not shown) or a travel limit switch (not shown) triggered by the movement of the carriage assembly 40. The carriage assembly 40 continues its forward movement until the interior suction cups 42 and the exterior suction cups 43, 43' and 44, 44' come into contact with one of the end walls 84 of the postal tray 82. This continued forward motion is employed to accommodate the different lengths of the postal trays 64, 74 and 82.

Because the interior suction cups 42 and the exterior suction cups 43, 43' and 44, 44' are pivotally mounted on the frame 38 of the vacuum-type gripping mechanism 28, they readily conform to the slope or shape of the end wall 84 of the postal tray 82. The ability of the interior suction cups 42 and the exterior suction cups 43, 43' and 44, 44' to conform to the slope or shape of the end wall 84 of the postal tray 82 is also facilitated by the relative relationships between the distances D1, D2 and D3 and the heights H1, H2 and H3. The interior suction cups 42 and the exterior suction cups 43, 43' and 44, 44' compress or collapse almost immediately upon contacting the end wall 84 of the postal tray 82 so that a vacuum is quickly established. In addition, because the interior suction cups 42 and the exterior suction cups 43, 43' and 44, 44' are made from a pliant material, there is less chance of the vacuum-type gripping mechanism 28 pushing the postal tray 82 away (i.e., towards the back of the bin 14).

Before the retrieval operation can continue, a determination must be made that a sufficient vacuum has been created between the vacuum-type gripping mechanism 28 and the postal tray 82. If the vacuum switch 56' associated with the interior suction cups 42 closes, thereby indicating that a sufficient vacuum exists and that the tray 82 is therefore sufficiently gripped for purposes of extraction, then the retrieval operation may continue. Alternatively, if both the vacuum switch 58' associated with the exterior suction cups 43 and 43' and the vacuum switch 59' associated with the exterior suction cups 44 and 44' close, thereby indicating that a sufficient vacuum exists and that the tray 82 is therefore sufficiently gripped for purposes of extraction, then the retrieval operation may continue. Obviously, if all of the vacuum switches 56', 58' and 59' close, then the retrieval operation may continue. It is only when the vacuum switch 56' and at least one of the vacuum switches 58' and 59' fail to close that the retrieval operation is prevented from continuing. The use of three separate vacuum-creating means (i.e., the vacuum pumps 52, 53, 54 and their associated vacuum switches 56', 58', 59', respectively) provides a redundancy which improves the operating reliability of the vacuum-type gripping mechanism 28.

Once it has been determined that a sufficient vacuum exists and that the tray 82 is therefore sufficiently gripped for purposes of extraction, two motions occur simultaneously. First, a micro-controller (not shown) functions to stop the forward motion of the carriage assembly 40. Second, the micro-controller functions to actuate the air cylinder 62, thereby causing the frame 38 of the vacuum-type gripping mechanism 28 to pivot from its rest position to its elevated position. As the frame 38 pivots from its rest position to its elevated position, the lift bar 60 engages the bottom of the bin 82 and raises the postal tray 82 off of the shelf 90 of the bin 14. When the frame 38 reaches its elevated position (see FIG. 14), the lift bar 60 has raised the postal tray 82 to an elevation which is sufficiently high so that the postal tray 82 will clear the retaining lips 94 on the arms 92 of the shelf 90.

Immediately after the lift bar 60 has raised the postal tray 82 to an elevation sufficient to allow the postal tray 82 to clear the retaining lips 94, the micro-controller causes the carriage assembly 40 to travel in a reverse direction at a relatively high rate of speed, and, as a result, to extract the postal tray 82 from the bin 14. As the carriage assembly 40 travels back across the turntable 22, another switch (not shown) opens, signalling the micro-controller to slow the reverse movement of the carriage assembly 40. When the carriage assembly 40 reaches its retracted position, the postal tray 82 is confirmed to be present on the turntable 22. This confirmation can be obtained visually, by a pressure-sensing mechanism (not shown) or by a photo-electric switch (not shown). The vacuum pumps 52, 53 and 54 are also turned off when the carriage assembly 40 reaches its retracted position and the micro-controller signals the air cylinder 62 to lower the lift bar 60 until the postal tray 82 is lowered onto the tracks 34 of the turntable 22. The extraction operation is now complete.

At the commencement of an insertion operation, the vacuum-type gripping mechanism 28 would be in its retracted position on the turntable 22 and the postal tray 82 would be supported on the tracks 34 of the turntable 22. With the vacuum pumps 52, 53 and 54 deactivated and the frame 38 in its rest position, the carriage assembly 40, under the control of the micro-controller (not shown), would move forward at a relatively high rate of speed toward the bin 14 of the rotary rack 12 designated to receive the postal tray 82. When the carriage assembly 40 reaches a predetermined position, a high-speed switch is tripped and the micro-controller slows the forward rate of travel of the carriage assembly 40. Maintaining its slower rate of speed, the carriage assembly 40 continues to move forward toward the designated bin 14 until another switch is triggered to completely stop the forward movement of the carriage assembly 40. When the movement of the carriage assembly 40 completely stops, the postal tray 82 is positioned in the designated bin 14. Upon the insertion of the postal tray 82 into the designated bin 14, the carriage assembly 40 is retracted at a relatively high rate of speed. The micro-controller, in response to a signal generated by a switch (not shown), stops the reverse travel of the carriage assembly 40 near the center of the turntable 22 in preparation for another insertion operation or an extraction operation.

It will be understood that the embodiment described herein is merely exemplary and that a person skilled in the art may make many variations and modifications without departing from the spirit and scope of the invention. All such variations and modifications are intended to be included within the scope of the invention as defined in the appended claims.

We claim:

1. Apparatus for handling a targeted item from among a variety of different items stored with shelf compartments of a storage shelving system, wherein each of said items has a flat face surface oriented in one of a plurality of substantially vertical planes, comprising:

a platform structure selectively positionable proximate each of said shelf compartments;
 a frame disposed on said platform structure;
 moving means for moving said frame relative to said platform between a retracted position, in which said frame is remote from said targeted item and an extended position, in which said frame is proximate said targeted item;
 cup gripping means arranged in a plurality of groupings, said cup gripping means having a bellows-like shape that provides gripping in anyone of said substantially vertical planes, wherein each group is pivotally attached to said frame and wherein at least one of said groupings is oriented in each of said selected number of planes, whereby at least one of said groupings engages said face surface regardless to which of said plurality of planes said face surface is oriented; and
 at least one vacuum-creating means coupled to said cup gripping means in each of said plurality of groupings for creating a vacuum independently in each of said plurality of groupings, wherein each of the cup gripping means in the groupings engaging said face surface can be attached to said face surface by suction, and wherein said targeted item can be selectively manipulated between one of said shelf compartments and said platform structure by the displacement of said frame between said retracted position and said extended position.

2. Apparatus according to claim 1, wherein said plurality of groupings include a first set of vacuum cups, and at least one second set of vacuum cups wherein said first set of vacuum cups and said second set of vacuum cups lay in different planes and contact said face surface of said targeted item at different points.

3. Apparatus according to claim 2, wherein said first set of vacuum cups are mounted on said frame at a first elevation and wherein at least one vacuum cup of each said second set of vacuum cups is mounted on said frame at a second elevation, which is higher than said first elevation.

4. Apparatus according to claim 3, wherein at least another vacuum cup of each said second set of vacuum cups is mounted on said frame at a third elevation, which is higher than said second elevation.

5. Apparatus according to claim 4, wherein said at least another vacuum cup of each said second set of vacuum cups extend from said frame a third distance, which is less than said second distance.

6. Apparatus according to claim 2, wherein said at least one vacuum-creating means includes a first vacuum pump connected to said first set of vacuum cups and a separate vacuum pump connected to each of said second set of vacuum cups wherein said first set of vacuum cups and each said second set of vacuum cups may be independently controlled.

7. Apparatus according to claim 6, wherein said first vacuum pump includes a first vacuum switch which closes in response to the creation of a vacuum in said first set of vacuum cups, and each said separate vacuum pump includes a separate vacuum switch which closes in response to the creation of a vacuum in each respective said second set of vacuum cups.

8. Apparatus according to claim 7, wherein said first vacuum switch and each of said separate vacuum switch enables said moving means, whereby said frame is moved between said extended position to said retracted position thereby moving said targeted item between one of said shelf compartments and said platform structure.

9. Apparatus according to claim 1, wherein said frame is pivotally attached to said platform structure, whereby said frame can be pivotally position between a rest position and an elevated position.

10. Apparatus according to claim 9, wherein each of said shelf compartments include a relating lip of a predetermined height that obstructs the removal of said items from said shelf compartments and wherein the distance between said rest position and said elevated position of said frame is greater than said predetermined height of said retaining lip, whereby said items stored in said shelf compartments can be raised above said retaining lip as said frame is moved form said rest position to said elevated position.

11. Apparatus according to claim 9, wherein said at least one vacuum-creating means is enabled when said frame is moved from said extended position to said retracted position and said vacuum-creating means is deactivated when said frame is moved from said retracted position to said extended position, whereby said cup gripping means can pull said targeted item from one of said shelf compartments or push said tarried item into one of said shelf compartments.

12. Apparatus according to claim 11, wherein said frame is maintained in said rest position as said frame moves from said retracted position to said extended position.

13. Apparatus according to claim 9, further comprising lifting means, attached to said frame, for pivoting said frame from said rest position to said elevated position.

14. Apparatus according to claim 13, wherein a projecting support member extends from said frame beneath said plurality of groupings wherein said projecting support member can be positioned below said targeted item and lifts said targeted item as said frame is pivoted from said rest position to said elevated position.

15. Apparatus according to claim 14, wherein said projecting support member engages a bottom surface of said targeted item as said frame is moved said rest position to said elevated position, lifting said targeted item a predetermined height.

16. Apparatus according to claim 13, wherein said lifting means includes an air cylinder for moving said frame between said rest position and said elevated position.

17. Apparatus according to claim 1, wherein said platform structure is rotatable.

18. Apparatus according to claim 1, wherein said items include postal trays wherein each of said postal trays have a solid bottom surface and divergent side surfaces sloped at a predetermined angle of inclination.

* * * * *